Figure 1:
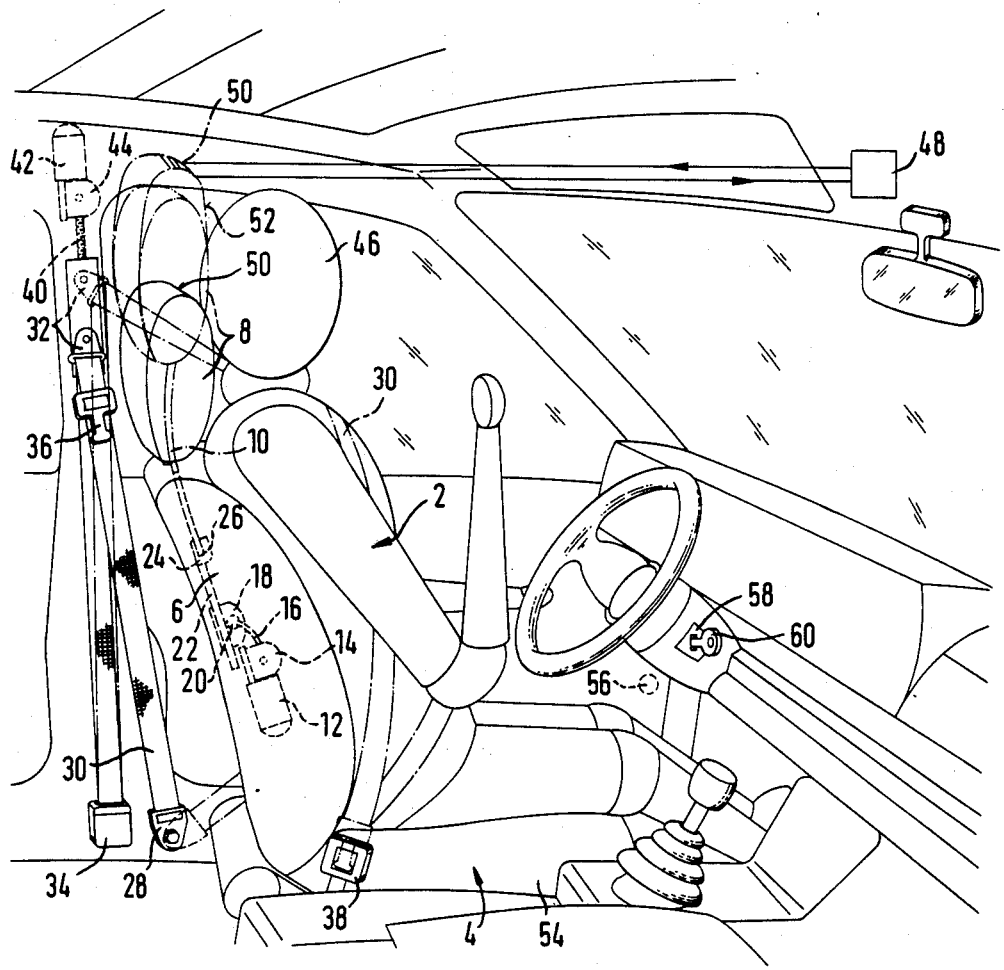

United States Patent [19]

Bruse et al.

[11] Patent Number: 4,645,233
[45] Date of Patent: Feb. 24, 1987

[54] INSTALLATION FOR THE ADJUSTMENT OF THE HEIGHT OF A HEADREST OF A VEHICLE SEAT

[75] Inventors: Kurt Bruse, Gaststätte Eichof, D-6534 Daxweiler; Gerhard Jurgens; Herbert Becker, both of Coburg, all of Fed. Rep. of Germany

[73] Assignees: Brose Fahzeugteile GmbH & Co. KG; Kurt Bruse, both of Fed. Rep. of Germany

[21] Appl. No.: 641,857

[22] Filed: Aug. 17, 1984

[30] Foreign Application Priority Data

Aug. 17, 1983 [DE] Fed. Rep. of Germany ....... 3329606
Jul. 25, 1984 [DE] Fed. Rep. of Germany ....... 3427466

[51] Int. Cl.4 ............................................. B60R 22/00
[52] U.S. Cl. .................................... 280/808; 280/753; 297/410
[58] Field of Search ...................... 280/808, 751, 753; 297/410, 391

[56] References Cited

U.S. PATENT DOCUMENTS

| 4,082,354 | 4/1978 | Renner et al. | 297/410 |
| 4,173,357 | 11/1979 | Jahn et al. | 280/808 |
| 4,222,608 | 9/1980 | Maeda | 297/391 |
| 4,285,545 | 8/1981 | Protze | 297/410 |
| 4,453,741 | 6/1984 | Hipp et al. | 280/808 |

FOREIGN PATENT DOCUMENTS

| 3240294 | 5/1984 | Fed. Rep. of Germany . |
| 3244504 | 6/1984 | Fed. Rep. of Germany ...... 297/391 |

Primary Examiner—John J. Love
Assistant Examiner—Ross Weaver
Attorney, Agent, or Firm—Barnes & Thornburg

[57] ABSTRACT

An installation for the adjustment of the height of a headrest of a vehicle seat, especially of a motor vehicle seat, by means of a motor mounted in or at the vehicle seat, in which a sensor is provided that detects the seating height of a person seated on the vehicle seat in the normal position and controls the motor for the height adjustment of the headrest in accordance with the detection results.

19 Claims, 5 Drawing Figures

INSTALLATION FOR THE ADJUSTMENT OF THE HEIGHT OF A HEADREST OF A VEHICLE SEAT

The present invention relates to an installation for the adjustment of the height of a headrest of a vehicle seat, especially of a motor vehicle seat by means of motor mounted in or at the vehicle seat.

It is the object of the present invention to automatically adjust the headrest to the respective height of the head of a person seated on a vehicle seat in order to lessen injuries of the person in case of a collision of the vehicle which occur as a result of a snapping-back of the head.

The underlying problems are solved according to the present invention in that a sensor is provided detecting the seating height of a person seated on the motor vehicle seat and controlling the motor for the height adjustment of the headrest in accordance with the sensing results.

In order to automatically adjust also a safety belt, the sensor additionally controls the motor for the height adjustment of the anchoring place of the safety belt.

The sensors in accordance with the present invention may be arranged and constructed in various ways as will be described more fully hereinafter. In order to achieve that the automatic adjustment respectively the automatic adjustments have been undertaken with certainty, when the person seating on the vehicle seat starts the drive, the sensor is preferably engaged by switches automatically actuated when the vehicle is ready for drive and the person is seated on the vehicle seat ready to start the drive.

These and other objects, features and advantages of the present invention will become more apparent from the following description when taken in conjunction with the accompanying drawing which shows, for purposes of illustration only, several embodiments in accordance with the present invention, and wherein:

FIG. 1 is a somewhat schematic perspective view of an installation for automatically adjusting the height of a headrest of a motor vehicle seat in accordance with the present invention; and FIGS. 2-5 are schematic perspective views, similar to FIG. 1, illustrating further embodiments in accordance with the present invention.

Referring now to the drawing wherein like reference numerals are used throughout the various views to designate like parts, and more particularly to FIG. 1, only this figure will be described in detail while the other FIGS. 2-5 will be described only to the extent they differ from FIG. 1.

FIG. 1 illustrates the interior space of a motor vehicle within the area of a driver 2. The driver 2 is seated on a vehicle seat 4 with an upholstered backrest 6 and an upholstered headrest 8. The headrest 8 is supported on rods 10 which are guided in the backrest 6. An electric motor 12 is located in the backrest 6, whose output shaft drives a speed reduction gear 14. The speed reduction gear 14 includes a flexible output shaft 16 which drives a pinion 16 located in a housing 18. The pinion 20 engages with a toothed rack 22 which is guided in the housing 18. The free end 24 of the toothed rack is disengageably connected with the rods 10, for example by means of clips 26, in such a manner that the rods 10 cannot tilt against one another. Corresponding constructions are known as such and are therefore not described in further detail.

On the left side of the person 2 a safety belt 30 is fastened at the vehicle in the lower part thereof by means of a fitting part 28 and is guided by way of a further fitting part 32 to a third fitting part 34 which is secured at the vehicle adjacent the first fitting part 28. The upper section of the safety belt 30 is guided through a latching part 36 which is to be inserted into a locking part 38 on the right side of the person 2 in the lower part of the vehicle.

The shoulder belt 30 with the fitting 32 and the latching part 36 is illustrated in full line in the non-used condition whereas it is illustrated in dash lines in the used condition, i.e. placed about the person 2.

The fitting 32 is seated by means of an internal thread on a threaded rod 40 which is the output shaft of a speed reduction gear driven by a motor 42.

All of the details described so far are known as such and do not form part of the present invention.

A light emitter-receiver 48 is mounted at the vehicle in front of the person 2 approximately at the height of the head 46 of this person. An upper area 50 of the front side 52 of the headrest 8 is constructed so as to be reflecting. If one or several switches of a switching arrangement (not shown) is or are closed, for example a switch in the seat 54 when the person sits down, or a switch in the lock 38 when the latching part 36 is inserted or a switch 56 when the door is closed and/or a switch 58 when rotating an ignition key 60, then the motor 12 is set into operation and the light-emitter-receiver 48 is engaged, as a result of which the headrest 8 is displaced upwardly until light from the light-emitter-receiver is reflected by the area 50 back onto light-emitter-receiver 48. The motor 12 and the light-emitter-receiver 48 are then automatically turned off. The headrest 8 has then the correct height. If the person 2 has terminated the drive and if one or several of the aforementioned switches are opened, then the motor 12 is again automatically set into operation and lowers the headrest 8. The motor 42 is controlled in the same manner as the motor 12 in order to bring the fitting part 32 into the height matched to the person 2.

Figure 2:
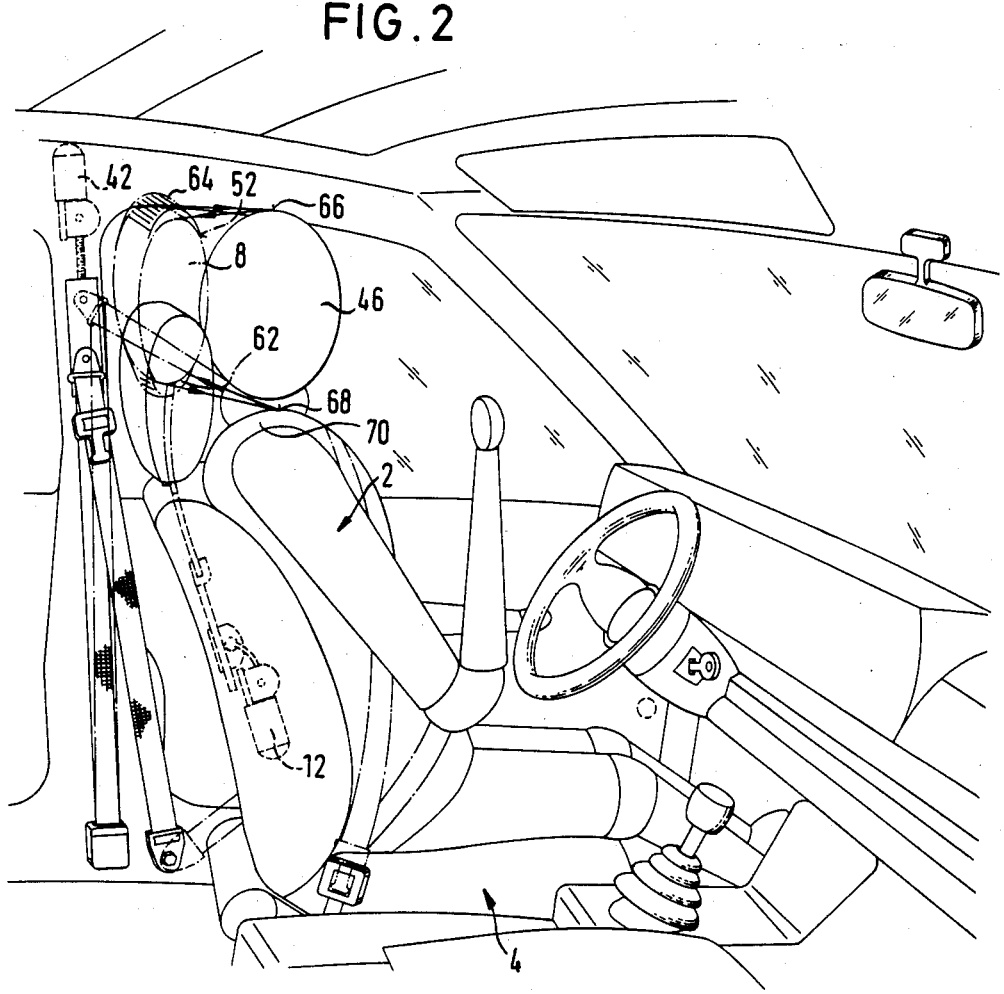

In the embodiment according to FIG. 2, one light-emitter-receiver each is located in the lower area 62 and in the upper area 64 of the front side 52 of the headrest 8. The highest surface 66 of the head 46 is detected by the upper light-emitter-receiver while the height 68 of a shoulder 70 of the person is detected by the lower light-emitter-receiver. If the headrest 8 is displaced too far in the upper direction, the reflection by the highest place of the head 46 respectively of the shoulder 70 will be absent, and this effects the turning off of the motors 12 and 42.

Figure 3:
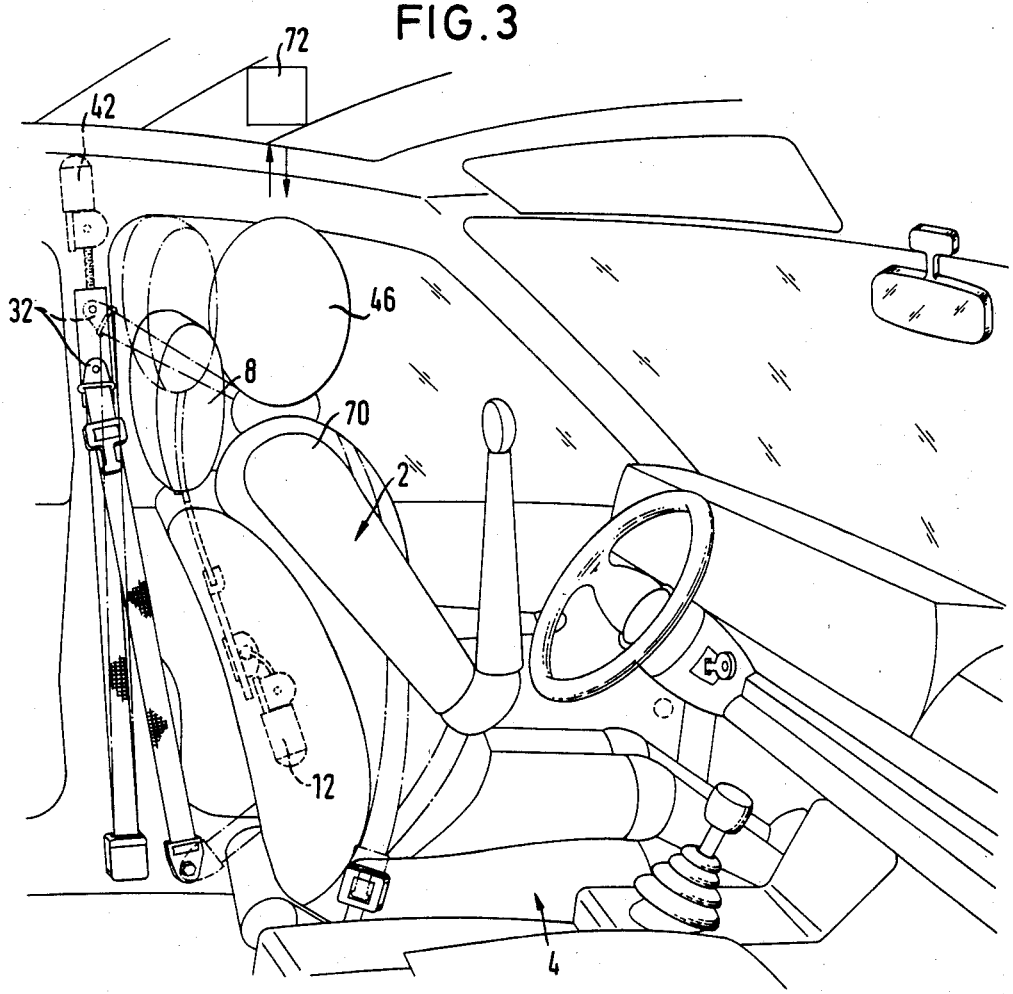

In the embodiment according to FIG. 3 a distance measuring device 72 is arranged above the head 46 respectively above the shoulder 70 of the person 2, in particular an ultrasonic distance measuring device which detects the height of the head 46 respectively of the shoulder 70 of the person 2 and adjusts in accordance with one these heights in the height of the headrest 8 respectively of the fitting part 32 by a corresponding control of the motors 12 and 42.

Figure 4:
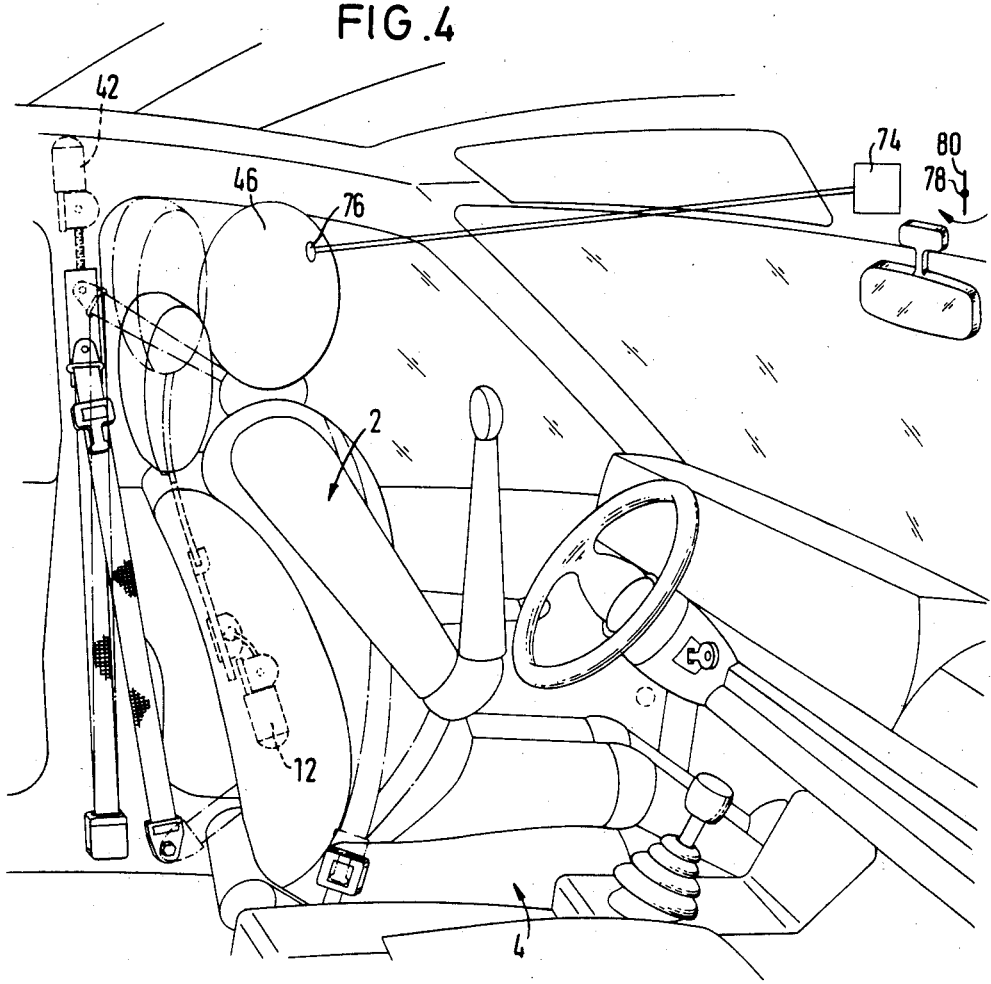

In the embodiment according to FIG. 4 a light-emitter-receiver 74 is arranged in the vehicle in front of the head 46, which responds to reflection of light from one eye 76 of the person 2 and controls the motors 12 and 42 in the described manner. Preferably the light-emitter-receiver includes a mirror rotating about a horizontal axis 78, from which the light is reflected which follows a vertical path in the form of a strip over the area of the head 46 of the person 2.

Figure 5:
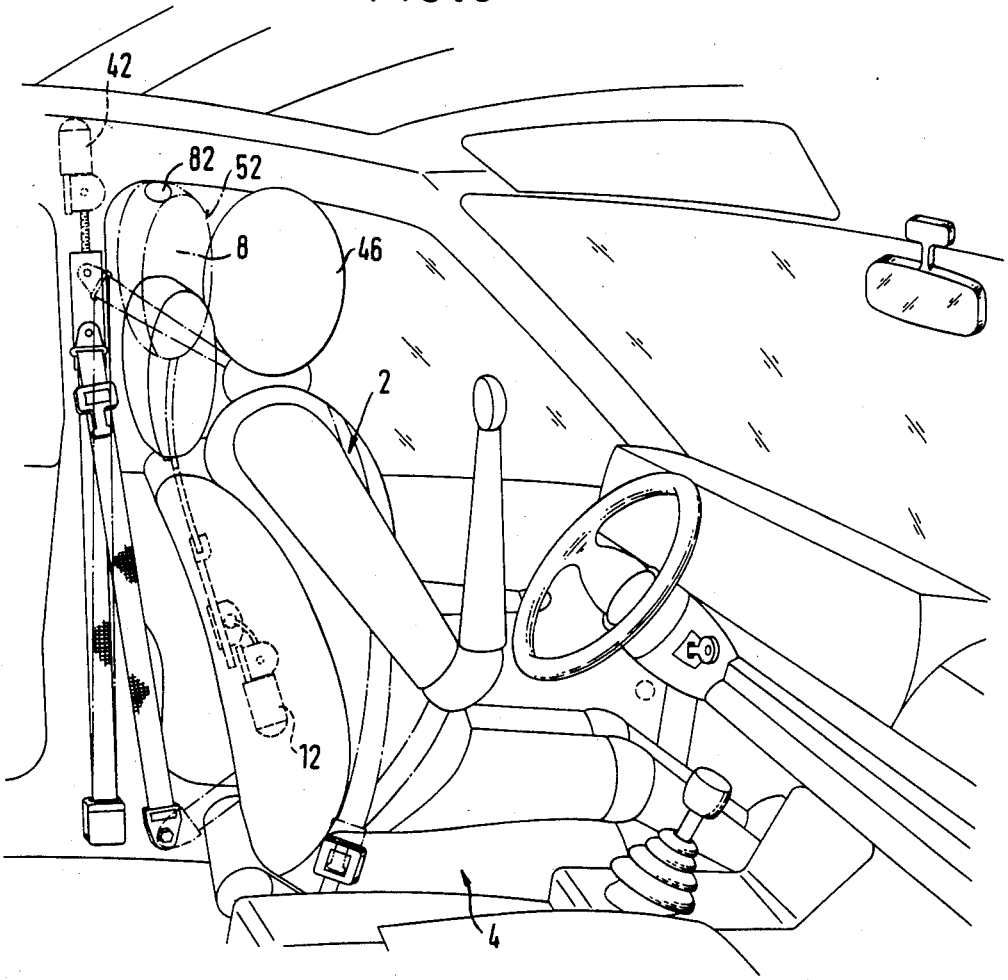

In the embodiment according to FIG. 5 a pyroelectric detector 82 is arranged in the upper area of the front side 52 of the headrest 8, which responds to the heat radiated by the head 46 of the person 2. If the pyroelectric detector 82 no longer receives sufficient heat radiation from the head 46, then the headrest 8 has the correct height and the motor 12 is turned off and correspondingly also the motor 42.

The various parts shown in block diagram as well as the control circuits to be used in the various embodiments may be of any well-known type and are therefore not described in detail herein.

While we have shown and described several embodiments in accordance with the present invention, it is understood that the same is not limited thereto but is susceptible of numerous changes and modifications as known to those skilled in the art and we therefore do not wish to be limited to the details shown and described herein but intend to cover all such changes and modifications as are encompassed by the scope of the appended claims.

We claim:

1. An installation for the adjustment of the height of a headrest of a vehicle seat, comprising motor means mounted on the vehicle seat, sensor means operable to detect the seating height of a person seated on the vehicle seat and automatically controlling the motor means in accordance with the detection results, including a safety belt adapted to be anchored and adjustable in height to the shoulder height of the person seated on the vehicle seat by means of a further motor means, the sensor means being additionally operable to control the further motor means for the height adjustment of the anchoring place of the safety belt, wherein the sensor means includes a light-emitter means arranged in the vehicle in front of a person seated on the vehicle seat in the usual position, a reflecting surface in the upper area of the front side of the headrest, and a light-receiver means arranged in the vehicle in front of the person, on which light transmitted by the light-emitter onto the reflecting surface is able to impinge.

2. An installation for the adjustment of the height of a headrest of a vehicle seat, comprising motor means mounted on the vehicle seat, sensor means operable to detect the seating height of a person seated on the vehicle seat and automatically controlling the motor means in accordance with the detection results, including a safety belt adapted to be anchored and adjustable in height to the shoulder height of the person seated on the vehicle seat by means of a further motor means, the sensor means being additionally operable to control the further motor means for the height adjustment of the anchoring place of the safety belt, wherein the sensor means includes a light-emitter means arranged within the area of the front side of the headrest and a light-receiver means arranged within the area of the front side of the headrest, light emitted from the light-emitter means and reflected by the person seated on the vehicle seat being received by said light-receiver means.

3. An installation for the adjustment of the height of a headrest of a vehicle seat, comprising motor means mounted on the vehicle seat, sensor means operable to detect the seating height of a person seated on the vehicle seat and automatically controlling the motor means in accordance with the detection results, including a safety belt adapted to be anchored and adjustable in height to the shoulder height of the person seated on the vehicle seat by means of a further motor means, the sensor means being additionally operable to control the further motor means for the height adjustment of the anchoring place of the safety belt, wherein said sensor means includes light-emitter means arranged in the upper area of the forward side of the headrest and a light-receiver means arranged in the upper area of the forward side of the headrest and operable to receive the light transmitted by said light-emitter means to the head of the person seated on the vehicle and reflected thereat.

4. An installation for the adjustment of the height of a headrest of a vehicle seat, comprising motor means mounted on the vehicle seat, sensor means operable to detect the seating height of a person seated on the vehicle seat and automatically controlling the motor means in accordance with the detection results, including a safety belt adapted to be anchored and adjustable in height to the shoulder height of the person seated on the vehicle seat by means of a further motor means, the sensor means being additionally operable to control the further motor means for the height adjustment of the anchoring place of the safety belt, wherein said sensor means includes a light-emitter means arranged in the lower area of the front side of the headrest and a light receiver means arranged in the lower area of the front side of the headrest, said light-receiver means being operable to receive light transmitted from said light-emitter means to the shoulder of a person seated on the vehicle seat and reflected thereat.

5. An installation for the adjustment of the height of a headrest of a vehicle seat, comprising motor means mounted on the vehicle seat, sensor means operable to detect the seating height of a person seated on the vehicle seat and automatically controlling the motor means in accordance with the detection results, including a safety belt adapted to be anchored and adjustable in height to the shoulder height of the person seated on the vehicle seat by means of a further motor means, the sensor means being additionally operable to control the further motor means for the height adjustment of the anchoring place of the safety belt, wherein said sensor means includes a distance measuring means arranged above the normal head or shoulder position of a person seated on the vehicle seat which detects the height of the head respectively shoulder of a person seated on the vehicle seat.

6. An installation according to claim 5, wherein said distance measuring means is an ultrasonic distance measuring device.

7. An installation for the adjustment of the height of a headrest of a vehicle seat, comprising motor means mounted on the vehicle seat, sensor means operable to detect the seating height of a person seated on the vehicle seat and automatically controlling the motor means in accordance with the detection results, including a saftety belt adapted to be anchored and adjustable in height to the shoulder height of the person seated on the vehicle seat by means of a further motor means, the sensor means being additionally operable to control the further motor means for the height adjustment of the anchoring place of the safety belt, wherein said sensor means includes a light-emitter means arranged in the vehicle in front of a person seated in the usual position on the vehicle seat and a light-receiver means operable to receive light reflected from one eye of the person.

8. An installation according to claim 7, wherein said light-emitter means includes a rotating mirror operable to rotate about a substantially horizontal axis.

9. An installation for the adjustment of the height of a headrest of a vehicle seat, comprising motor means mounted on the vehicle seat, sensor means operable to detect the seating height of a person seated on the vehicle seat and automatically controlling the motor means in accordance with the detection results, including a safety belt adapted to be anchored and adjustable in height to the shoulder height of the person seated on the vehicle seat by means of a further motor means, the sensor means being additionally operable to control the further motor means for the height adjustment of the anchoring place of the safety belt, wherein said sensor means includes a pyroelectric detector means arranged in the upper area of the front side of the headrest.

10. An installation for the adjustment of the height of a headrest of a vehicle seat, comprising motor means mounted on the vehicle seat, sensor means operable to detect the seating height of a person seated on the vehicle seat and automatically controlling the motor means in accordance with the detection results, including a safety belt adapted to be anchored and adjustable in height to the shoulder height of the person seated on the vehicle seat by means of a further motor means, the sensor means being additionally operable to control the further motor means for the height adjustment of the anchoring place of the safety belt, further comprising a switching circuit means including switch means for engaging the sensor means, said switch means being automatically actuated by a vehicle ready for a driving operation and a person seated on the vehicle seat ready for starting to drive.

11. An installation for the adjustment of the height of a headrest of a vehicle seat, comprising motor means mounted on the vehicle seat, sensor means operable to detect the seating height of a person seated on the vehicle seat and automatically controlling the motor means in accordance with the detection results, wherein the sensor means includes a light-emitter means aranged in the vehicle in front of a person seated on the vehicle seat in the usual positon, a reflecting surface in the upper area of the front side of the headrest, and a light-receiver means arranged in the vehicle in front of the person, on which light transmitted by the light-emitter onto the reflecting surface is able to impinge.

12. An installation for the adjustment of the height of a headrest of a vehicle seat, comprising motor means mounted on the vehicle seat, sensor means operable to detect the seating height of a person seated on the vehicle seat and automatically controlling the motor means in accordance with the detection results, wherein the sensor means includes a light-emitter means arranged within the area of the front side of the headrest and a light-receiver means arranged within the area of the front side of the headrest, light emitted from the light-emitter means and reflected by the person seated on the vehicle seat being received by said light-receiver means.

13. An installation for the adjustment of the height of a headrest of a vehicle seat, comprising motor means mounted on the vehicle seat, sensor means operable to detect the seating height of a person seated on the vehicle seat and automatically controlling the motor means in accordance with the detection results, wherein said sensor means includes light-emitter means arranged in the upper area of the forward side of the headrest and a light-receiver means arranged in the upper area of the forward side of the headrest and operable to receive the light transmitted by said light-emitter means to the head of the person seated on the vehicle and reflected thereat.

14. An installation for the adjustment of the height of a headrest of a vehicle seat, comprising motor means mounted on the vehicle seat, sensor means operable to detect the seating height of a person seated on the vehicle seat and automatically controlling the motor means in accordance with the detection results, wherein said sensor means includes a light-emitter means arranged in the lower area of the front side of the headrest and a light-receiver means arranged in the lower area of the front side of the headrest, said light-receiver means being operable to receive light transmitted from said light-emitter means to the shoulder of a person seated on the vehicle seat and reflected thereat.

15. An installation for the adjustment of the height of a headrest of a vechicle seat, comprising motor means mounted on the vehicle seat, sensor means operable to detect the seating height of a person seated on the vehicle seat and automatically controlling the motor means in accordance with the detection results, wherein said sensor means includes a distance measuring means arranged above the normal head or shoulder position of a person seated on the vehicle seat which detects the height of the head respectively shoulder of a person seated on the vehicle seat.

16. An installation for the adjustment of the height of a headrest of a vehicle seat, sensor means operable to detect the seating height of a person seated on the vehicle seat and automatically controlling the motor means in accordance with the detection results, wherein said sensor means includes a light-emitter means arranged in the vehicle in front of a person seated in the ususal position on the vehicle seat and a light-receiver means operable to receive light reflected from one eye of the person.

17. An installation according to claim 16, wherein said light-emitter means includes a rotating mirror operable to rotate about a substantially horizontal axis.

18. An installation for the adjustment of the height of a headrest of a vehicle seat, sensor means operable to detect the seating height of a person seated on the vehicle seat and automatically controlling the motor means in accordance with the detection results, wherein said sensor means includes a pyroelectric detector means arranged in the upper area of the front side of the headrest.

19. An installation for the adjustment of the height of a headrest of a vehicle seat, sensor means operable to detect the seating height of a person seated on the vehicle seat and automatically controlling the motor means in accordance with the detection results, further comprising a switching circuit means including switch means for engaging the sensor means, said switch means being automatically actuated by a vehicle ready for a driving operation and a person seated on the vehicle seat ready for starting to drive.

* * * * *